United States Patent [19]

Davies

[11] Patent Number: 4,708,515

[45] Date of Patent: Nov. 24, 1987

[54] STOCK BARRIER

[76] Inventor: David T. Davies, Erw Bach, The Nant, Pentre Halkyn, Nr. Holywell, Clwyd, CH8 8BD, Wales

[21] Appl. No.: 897,715

[22] Filed: Aug. 18, 1986

[30] Foreign Application Priority Data

Aug. 17, 1985 [GB] United Kingdom ............... 8520654

[51] Int. Cl.$^4$ ............................................. E01F 13/00
[52] U.S. Cl. ......................................... 404/6; 404/10; 49/58; 49/131
[58] Field of Search ..................... 404/6, 9, 10; 49/33, 49/58, 131, 132, 134; 119/28, 82

[56] References Cited

U.S. PATENT DOCUMENTS

| 1,479,736 | 1/1924 | Petty | 49/131 X |
| 1,499,120 | 6/1924 | Nies | 49/131 |
| 2,007,071 | 7/1935 | Burns | 49/131 |
| 2,024,063 | 12/1935 | Roper | 49/131 |
| 2,744,728 | 5/1956 | Melchert et al. | 49/131 X |
| 3,256,637 | 6/1966 | Torrey | 49/131 X |
| 3,491,482 | 1/1970 | Wedekind | 49/131 |
| 3,516,202 | 6/1970 | Justice | 49/131 |
| 3,744,185 | 7/1973 | Patterson | 49/131 |

FOREIGN PATENT DOCUMENTS 2165569 4/1986 United Kingdom ................... 404/6

Primary Examiner—Stephen J. Novosad
Assistant Examiner—John F. Letchford
Attorney, Agent, or Firm—Anthony J. Casella; Gerald E. Hespos

[57] ABSTRACT

The present invention provides a stock barrier comprising a number of rigid metal panels of open grid construction, the panels being arranged to lie in a normal operational position at an angle to the ground to thus form a pair of back-to-back ramps across which stock will not cross but which can be flattened to the ground against a resilient return force when a vehicle drives across. The panels are pivotable upwards from the flattened position, about a side edge thereof whereby to leave a clear path for stock to pass through the barrier when required.

10 Claims, 14 Drawing Figures

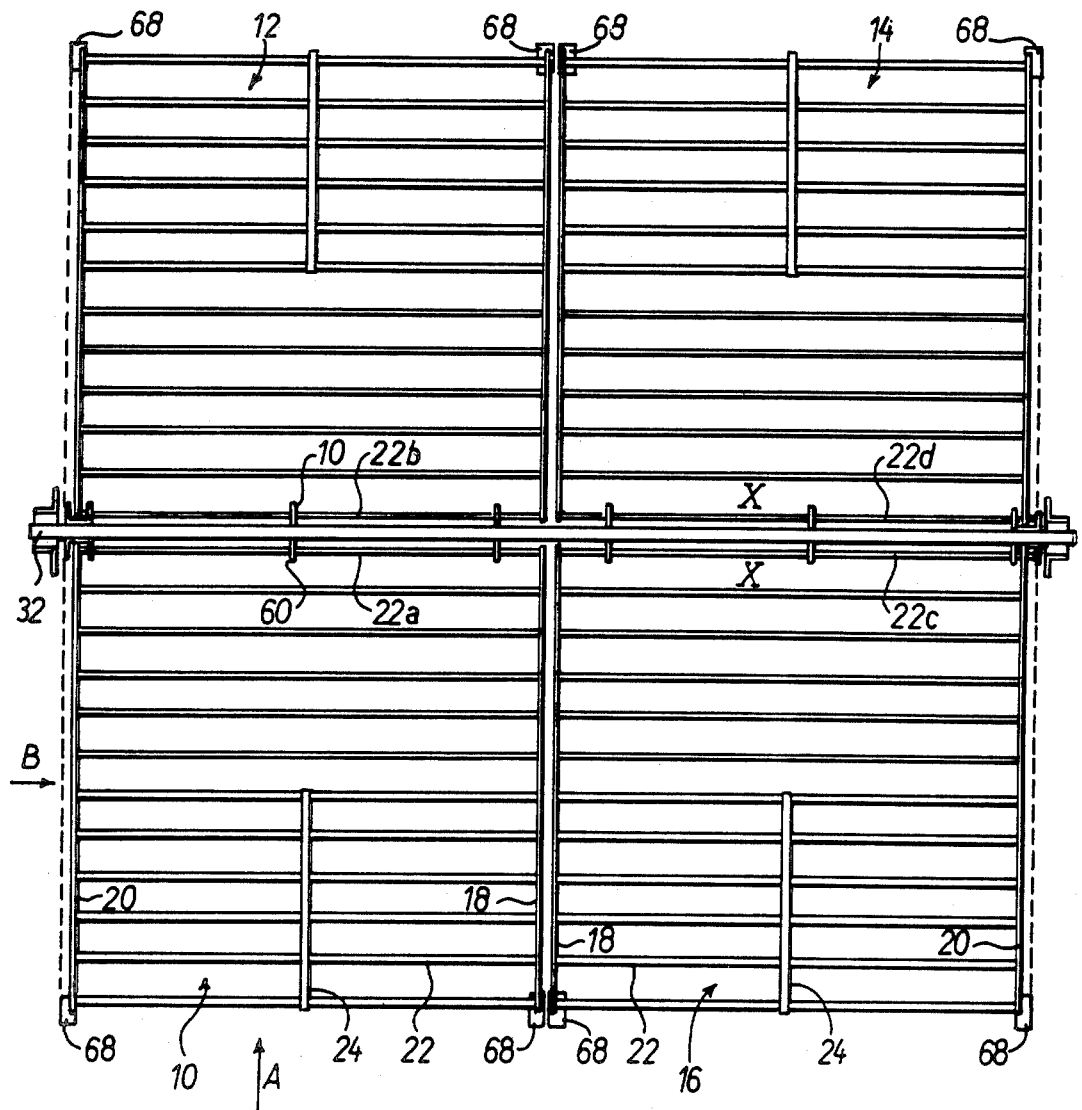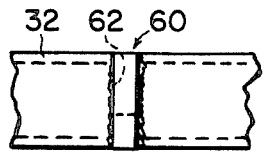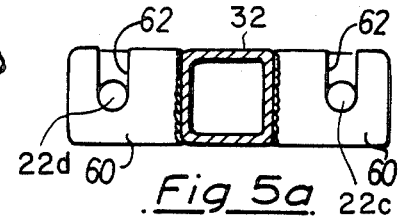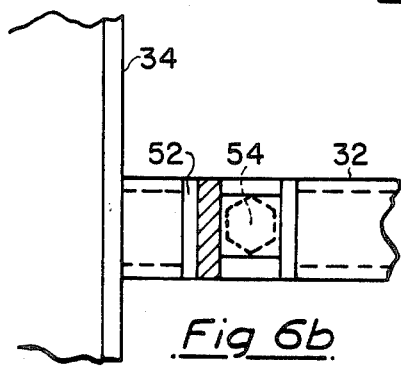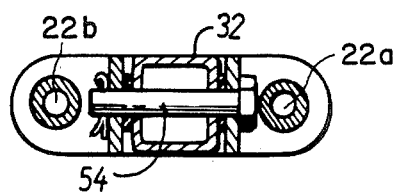

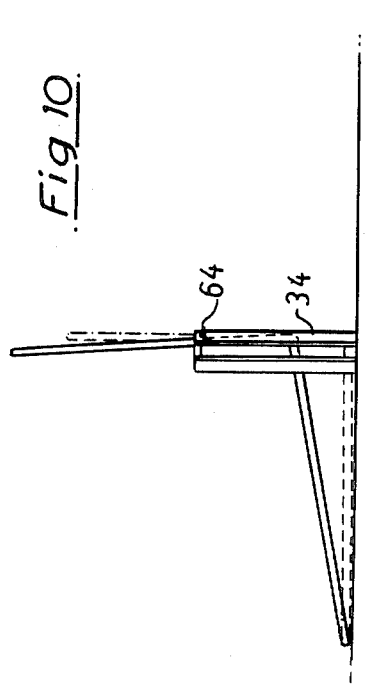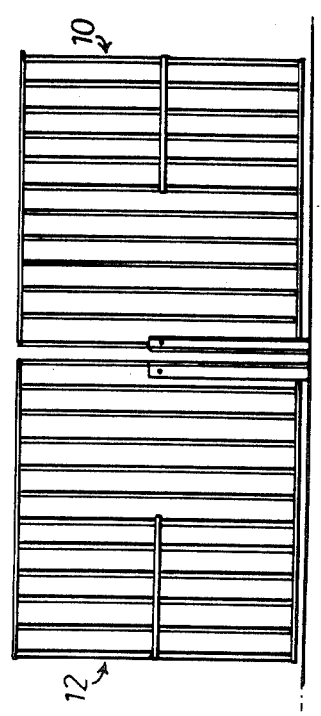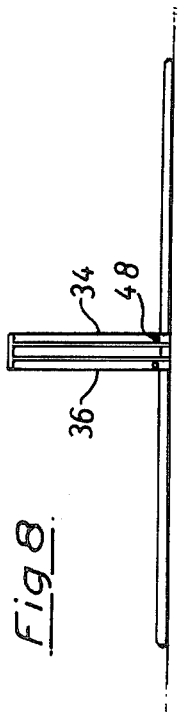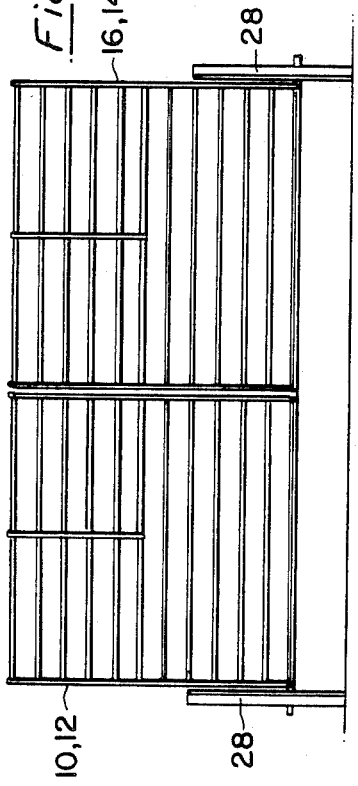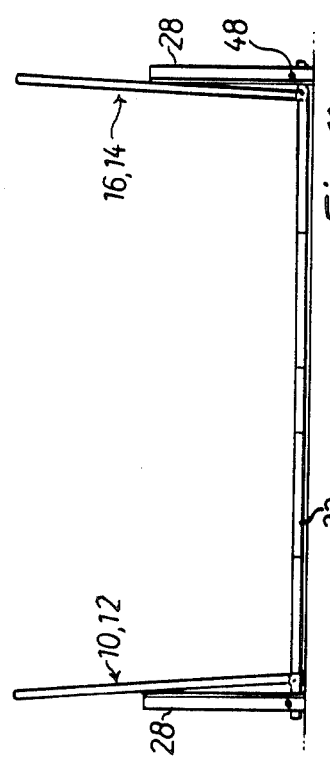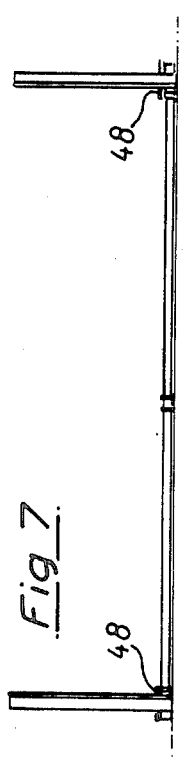

STOCK BARRIER

DESCRIPTION

This present invention relates to stock barriers, sometimes known as cattle grids, which are used primarily to enable vehicle access to areas in which animals, such as cows, sheep, goats, are to be confined.

Conventional cattle grids comprise a plurality of spaced, parallel metal bars which are laid over an open-topped, usually rectangular hole in the ground. The hole, which is usually about two feet deep, is disposed in a path or roadway where such path or roadway passes through a fence or wall surrounding the area in which the animals are to be confined. The spacing between adjacent bars of the grid is chosen to be greater than the width of the hooves of the animals to be confined. The animals are therefore unable to negotiate the grid without falling through and they are therefore effectively confined without the necessity for a gate. Humans and their various vehicles can of course negotiate the grid without difficulty.

A practical problem with this conventional arrangement is the necessity for a relatively large hole to be excavated, lined and drained. This has become a relatively expensive operation both in terms of time and money. The structure once formed is also of a permanent nature. During construction, the road or pathway is unusable and access to the area is obstructed.

To solve the latter problem, it is known to form a cattle grid from two or more flat grid sections which are hinged together about adjacent side edges so as to be pivotable one relative to the other, the grid portions being resiliently supported at their hinged regions so that the hinge is normally supported at a predetermined height above the ground level whereby the two grid sections each form an acute angle with the ground but such that a load applied to the resilient support by a vehicle passing over the grid causes the hinge to be lowered relative to the ground and the acute angle of the grid sections to be correspondingly reduced.

The latter structure still has the problem, however, that even when fixed in their flattened positions, the grid sections form a surface over which cows, sheep etc., cannot safely be driven without potential damage to hooves, feet etc. Thus, when this known structure is used, it is necessary to provide a separate gate at a different location to the grid to enable stock to be driven past the grid.

It is an object of the present invention to provide a stock barrier or cattle grid of the latter type but in which the aforedescribed problem is obviated.

In accordance with a first aspect of the present invention, there is provided a stock barrier made of rigid metal panels of open grid construction which, in a normal operational position, lie at an angle to the ground to form a pair of back-to-back ramps across which stock will not cross but which can be flattened to the ground against a resilient return force when a vehicle drives onto same, and the panels being pivotable upwards about a side edge thereof whereby to leave a ground path clear for stock to pass through the barrier when required.

In accordance with a second aspect of the present invention, there is provided a stock barrier comprising a rigid horizontal bar which is supported resiliently so as normally to lie above ground level, two flat, rigid, rectangular metal panels of open grid construction disposed one on each side of said bar and pivotally coupled thereto about one end edge so that the grid panels normally form two oppositely directed ramps whose upper edges meet at the bar, the arrangement being such that when a load is applied to the resilient support by a vehicle passing over the barrier the bar is caused to be lowered whereby both grid panels are flattened to the ground until the vehicle has passed, whereupon the resilient support returns the bar and grid panels to their raised positions forming said ramps, and wherein the grid panels are also pivotable about one side edge so that, with the bar depressed and held in a position flat against the ground, the grid panels can be pivoted upwards about said side edges so as to leave an unobstructed path for stock to pass across the area normally covered by the grid panels.

In accordance with a third aspect of the present invention, there is provided a stock barrier comprising a rigid horizontal bar which is supported resiliently so as normally to lie above ground level, four flat, rigid, rectangular metal panels of open grid construction disposed two on each side of said bar and pivotally coupled thereto about one end edge so that the grid panels normally form two oppositely directed ramps whose upper edges meet at the bar, the arrangement being such that when a load is applied to the resilient support by a vehicle passing over the barrier the bar is caused to be lowered whereby all four grid panels are flattened to the ground until the vehicle has passed, whereupon the resilient support returns the bar and grid panels to their raised positions forming said ramps, and wherein the grid panels are also pivotable about one side edge so that, with the bar depressed and held in a position flat against the ground, the four grid panels can be pivoted upwards about said side edges so as to leave an unobstructed path for stock to pass across the area normally covered by the grid panels.

Preferably, the grid panels may also be pivoted upwards about said bar to a substantially vertical position in which they act as a gate to prevent vehicles crossing the barier. Normally, only the panel, or panels, on one side of the bar need be lifted for this purpose.

To enable the required freedom of movement of the panels relative to the horizontal bar, one corner of each panel is connected to the bar by means of a dual hinge arrangement which permits pivoting of the panel about a first axis parallel to the bar and also about a second axis perpendicular to the bar.

Whilst the resilient support may include solely a coiled spring which may be extended or compressed when a vehicle flattens the barrier, additionally a shock absorber or damper may be included in the resilient support to allow for the barrier to be quickly flattened by a vehicle and slowly returned to its in-use position. In this way, the barrier cannot return quickly and possibly damage the rear of the vehicle.

The invention is described further hereinafter, by way of example only, with reference to the accompanying drawings, in which:

FIG. 3 is an enlarged scale plan view of the embodiment of FIGS. 1 and 2, not showing the side posts;

FIG. 5a is an enlarged-scale section on X—X in FIG. 3;

FIG. 5b is an end view of the detail of FIG. 5(a);

FIGS. 6a and 6b show details of the hinge arrangement of FIG. 4;

FIGS. 7 and 8 are front and side views showing a first operational state of the stock barrier;

FIGS. 9 and 10 are front and side views showing a second operational state of stock barrier; and FIGS. 11 and 12 are front and side views showing a third operational state of the stock barrier.

Figure 1:
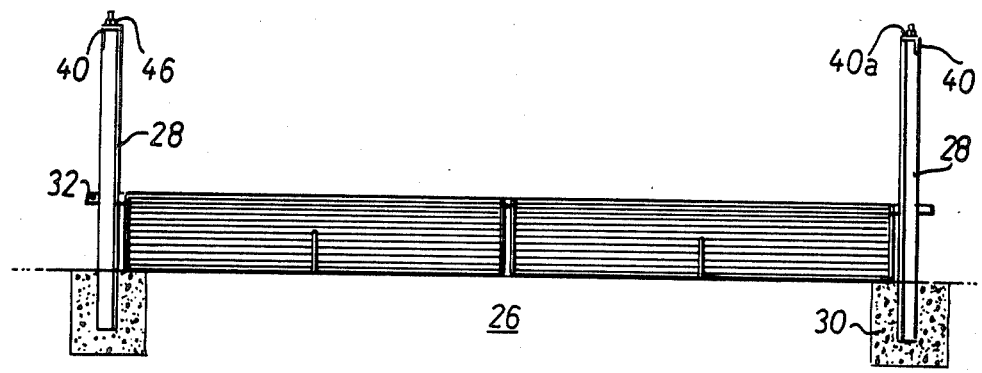
FIG. 1 is a front view of one embodiment of a stock barrier in accordance with the present invention, viewed in the direction of arrow A in FIG. 3.
Figure 2:
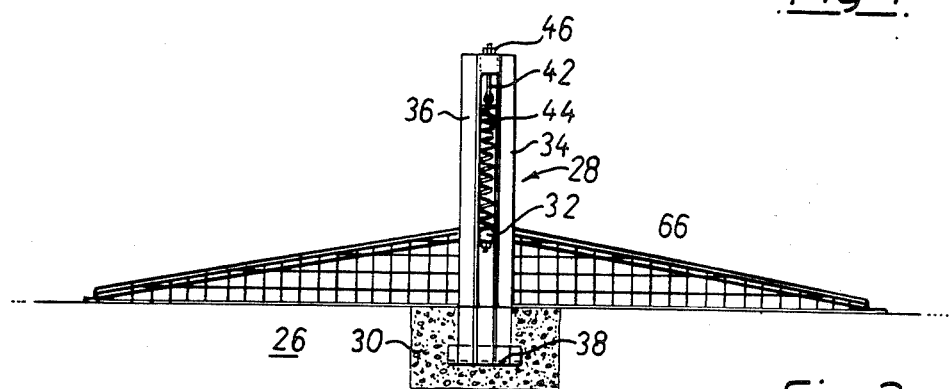
FIG. 2 is a side view of the embodiment of FIG. 1, viewed in the direction of arrow B in FIG. 3.

With reference first to FIGS. 1 to 3, the illustrated stock barrier includes four similar, generally rectangular grid panels 10, 12, 14, 16, each of which comprises a pair of parallel side bars 18, 20 of rectangular section which are interconnected by a plurality of equally spaced parallel rods 22 of circular or rectangular section. The outer six of each plurality of rods 22 are interconnected by central strengthening bars 24 extending parllel to the side bars 18,20.

Fixed into respective holes in the ground 26 at the two opposite sides of the barrier are a pair of side posts 28 which can be made of steel or concrete and which are set in place in the ground by concrete 30. If the overall width of the grid part of the barrier is the same as or greater than the width of the road or path with which it is to be used, then of course, the holes for receiving the posts 28 are not disposed in the road surface itself but at the two sides thereof. In this event no excavation of the road surface itself is necessary.

Suspended horizontally between the posts 28 is a rigid metal beam 32 of hollow rectangular section which can be selectively strengthened according to the width of the structure. Preferably, each post 28 comprises a pair of upright angle members 34, 36 welded at their lower ends to a further angle member 38 and at their upper ends to an angle member 40, one side 40a of which lies horizontally over the top of the upright members 38. The part 40a contains a central aperture which receives one end of a depending eyebolt 42 whose eye anchors the upper end of a tension coil spring 44 disposed between the upright angle members 38. The lower end of the spring is connected to one of the free ends of the beam 32. Each eye bolt 42 is locked in the aperture in the associated angle member 40 by a respective pair of lock nuts 46 which enable the heights of the eye bolts to be adjusted for the purposes of presetting the spring tensions and the heights of the ends of the beam above the ground so that the beam is supported in the required horizontal attitude. It has been found that a normal height of about 300 cms. for the beam 32 is ideal.

By pressing downwardly on the beam 32, it can be brought to a lowermost position lying flat on the ground surface. For a reason described further below, the beam 32 can be locked in this position by inserting pins 48 (see FIGS. 7 and 8) into holes adjacent the lower ends of the upright members 34, 36.

As best seen in FIG. 3, the four grid panels are arranged with the panels 12, 14 on one side of the beam 32 and with the panels 10, 16 on the other side, the panels being pivotally mounted on the beam so that, as best seen in FIG. 1, the individual panels all lie at a shallow acute angle to the ground when the beam is in its normal, unlocked position. The two panels on one side of the beam thereby provide a rising ramp and the two panels on the other side of the beam providing a falling ramp (or vice versa). Thus, to an animal presented with the barrier, the effect is equivalent to the traditional cattle grid where the bars are disposed over a hole—the animal cannot progress further than the first or second of the rods 22 and hence is effectively prevented from crossing the barrier.

However, should a vehicle cross the barrier, then depending upon the weight of the vehicle and the strength of the springs 44, the springs are stretched to enable the grid panels to adopt the position shown in FIGS. 7 and 8 in which they lie flat on the surface of the ground, thus allowing the vehicle to pass unimpeded over the barrier.

To prevent the quick return of the barrier to an in-use position, a shock absorber, i.e. gas damper 45, incorporating the spring 44 or additional to the spring 44, can be provided in each support. This modification can prevent possible damage to the rear of the vehicle by the return motion of the barrier.

The manner in which the grid panels 10, 12, 14 and 16 are interconnected with the beam 32 is illustrated in detail in FIGS. 3 to 6. As viewed in FIG. 3, the left-hand end of that one 22a of the rods 22 closest to the beam 32 extends slightly beyond the side bar 20 (see FIG. 4) and is loosely received in aligned holes 50 in the two arms of a channel-sectioned bracket 52 whose base is coupled to the beam 32 by means of a bolt 54 and washer 56. The bolt 54 and washer 56 enable the bracket 52 to rotate about the bolt 54 relative to the beam 32. A split pin 58 holds the bracket on the bar 22a. The other end of the bolt 54 attaches a similar channel-section bracket 52a to the opposite side of the beam 54 so that the latter bracket can again rotate on the bolt 54 relative to the beam 32. The two arms of the bracket 52a are pivotally attached to that one 22b of the rods 22 of the panel 12 closest to the beam 32, in a similar manner to the rod 22a of the panel 10. An equivalent hinge structure is provided at the right hand side of that one 22c of the rods 22 of the panel 16 closest to the beam 32 and at the right hand side of that one 22d of the rods 22 of the panel 14 closest to the beam 32 (as viewed in FIG. 3). The rods 22a, 22b should be of circular section.

As shown in FIGS. 5a and 5b, welded at positions spaced along the length of the beam 32 and on both sides thereof are a plurality (eight shown) of small metal plates 60 extending at right angles to the beam 32 and each containing a vertical slot 62 in its upper edge. The aligned slots 62 on one side of the beam 32 receive the rods 22a, 22c of the panels 10, 16 so as to provide a pivotal support therefor. Similarly, the aligned slots 62 on the other side of the beam 32 provide a pivotal support for the rods 22b, 22d on the panels 12 and 14.

Thus, the brackets 52 and the slots 62 co-operate to serve as hinges enabling the panels 10, 12, 14 and 16 to pivot relative to the beam 32 about the end rods 22a, 22b, 22c, 22d as required to enable the panels to be flattened against the ground when the beam 32 is caused to be lowered.

As illustrated in FIGS. 9 and 10, the pivotal mounting of the panels also enables them to be lifted to positions at right angles to the ground to act as a gate to vehicles. Normally, just one set of panels (say the panels 10 and 16) would be raised as shown in FIG. 10. They can be locked in this position by means of suitable pins by engaging in apertures in the upright member 34.

Figure 4:
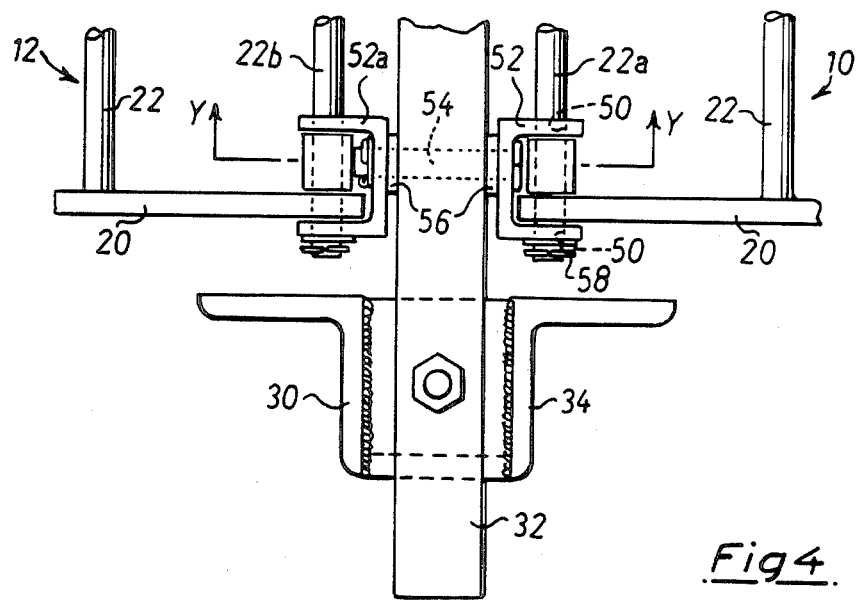
FIG. 4 is an enlarged-scale detail showing the two-way hinge by which the grid panels are hingedly interconnected with the central beam.

By virtue of the hinge arrangement shown in FIG. 4 wherein the brackets 52 can rotate about the bolts 54, the panels can also be raised sideways through 90° (or preferably slightly more) out of the slots 62 to the positions shown in FIGS. 11 and 12 wherein, with the beam 32 held flat against the ground by the pins 48, only the beam 32 lies in the path between the raised panels and animals can pass unimpeded across the barrier. Thus, there is no need for a separate gate to be provided to enable stock to cross the barrier as would normally be the case with conventional barriers.

Spring latches (not shown) can be used to hold the panels in their raised positions of FIGS. 11 and 12.

As shown in FIG. 2, steel mesh 66 is provided at the sides of the barrier to prevent people from placing feet under the grid panels when vehicles are passing over. The mesh also prevents stock from getting under the panels.

Eight metal guide plates 68 are spiked into the ground surface, preferably in concrete, to provide flat surfaces on which the outer corners of the grid sections can slide or rotate in use.

Thus, the present invention provides a barrier which (a) provides a cattle grid type of arrangement to keep stock from crossing the barrier; (b) allows vehicles to pass unimpeded and also (c) permits the grid panels to be raised sideways to allow stock to pass when required. It is a considerable advantage of the present structure that its cost of construction and of erection is considerably less than that of conventional fixed cattle grids.

If desired, the metal of the barrier can be galvanised to extend its operational life.

I claim:

1. A stock barrier comprising rigid metal panels of open grid construction, said panels being arranged to be in a normal operational position, at an angle to the ground to form a pair of back-to-back ramps across which stock will not cross but which can be flattened to the ground against a resilient return force when a vehicle drives onto same, the panels being pivotable upwards about a side edge thereof whereby to leave a ground path clear for stock to pass through the barrier when required.

2. A stock barrier according claim 1, wherein the resilient return force is provided by a spring coupled with a damper, the damper being arranged to retard the return motion of the barrier to the normal operational position.

3. A stock barrier comprising a rigid horizontal bar which is supported resiliently so as to normally lie above ground level, two flat, rigid, rectangular metal panels of open grid construction disposed one on each side of said bar and pivotally coupled thereto about one end edge so that the grid panels normally form two oppositely directed ramps whose upper edges meet at the bar, the arrangement being such that when a load is applied to the resilient support by a vehicle passing over the barrier the bar is caused to be lowered whereby both grid panels are flattened to the ground until the vehicle has passed, whereupon the resilient support returns the bar and grid panels to their raised positions forming said ramps, and wherein the grid panels are also pivotable about one side edge so that, with the bar depressed and held in a position flat against the ground, the grid panels can be pivoted upwards about said side edges so as to leave an unobstructed path for stock to pass across the area normally covered by the grid panels.

4. A stock barrier according to claim 3, wherein said grid panel on one side of the bar is pivotable upwards about said bar to a substantially vertical position.

5. A stock barrier according to claim 3, wherein one corner region of each grid panel is connected to said bar by means of a two-direction hinge which permits pivotting of the panel about a first axis parallel to the bar and also about a second axis perpendicular to said bar.

6. A stock barrier according to claim 3, wherein the resilient return force is provided by a spring coupled with a damper, the damper being arranged to retard the return motion of the barrier to the normal operational position.

7. A stock barrier comprising a rigid horizontal bar which is supported resiliently so as normally to lie above ground level, four flat, rigid, rectangular metal panels of open grid construction disposed two on each side of said bar and pivotally coupled thereto about one end edge so that the grid panels normally form two oppositely directed ramps whose upper edges meet at the bar, the arrangement being such that when a load is applied to the resilient support by a vehicle passing over the barrier the bar is caused to be lowered whereby all four grid panels are flattened to the ground until the vehicle has passed, whereupon the resilient support returns the bar and grid panels to their raised positions forming said ramps, and wherein the grid panels are also pivotable about one side edge so that, with the bar depressed and held in a position flat against the ground, the four grid panels can be pivoted upwards about said side edges so as to leave an unobstructed path for stock to pass across the area normally covered by the grid panels.

8. A stock barrier according to claim 7, wherein the grid panels on one side of the bar are pivotable upwards about said bar to a substantially vertical position.

9. A stock barrier according to claim 7, wherein one corner region of each grid panel is connected to said bar by means of a two-direction hinge which permits pivotting of the panel about a first axis parallel to the bar and also about a second axis perpendicular to said bar.

10. A stock barrier according to claim 7, wherein the resilient return force is provided by a spring coupled with a damper, the damper being arranged to retard the return motion of the barrier to the normal operational position.

* * * * *